United States Patent
Kauffman et al.

(10) Patent No.: US 12,051,993 B2
(45) Date of Patent: Jul. 30, 2024

(54) CLAMPING SYSTEM FOR MOUNTING A SOLAR PANEL

(71) Applicant: Unirac Inc., Albuquerque, NM (US)

(72) Inventors: Chris Kauffman, Rio Rancho, NM (US); Nathan Schuit, Moriarty, NM (US)

(73) Assignee: Unirac Inc., Albuquerque, NM (US)

( * ) Notice: Subject to any disclaimer, the term of this patent is extended or adjusted under 35 U.S.C. 154(b) by 334 days.

(21) Appl. No.: 17/127,222

(22) Filed: Dec. 18, 2020

(65) Prior Publication Data

US 2022/0200521 A1 Jun. 23, 2022

(51) Int. Cl.
  *H02S 30/10* (2014.01)
  *F16B 2/12* (2006.01)
  *H02S 20/22* (2014.01)

(52) U.S. Cl.
  CPC ............. *H02S 30/10* (2014.12); *F16B 2/12* (2013.01); *H02S 20/22* (2014.12)

(58) Field of Classification Search
  CPC ....................................................... H02S 30/10
  See application file for complete search history.

(56) References Cited

U.S. PATENT DOCUMENTS

| | | | |
|---|---|---|---|
| 6,205,719 B1 * | 3/2001 | Bruce | F24S 25/70 248/62 |
| 7,866,099 B2 | 1/2011 | Komamine et al. | |
| 8,893,445 B2 * | 11/2014 | Yen | H02S 20/30 52/173.3 |
| 8,938,932 B1 | 1/2015 | Wentworth et al. | |
| 9,825,581 B2 | 11/2017 | Wildes | |
| 2003/0070368 A1 * | 4/2003 | Shingleton | F24S 25/33 52/173.3 |
| 2008/0210221 A1 * | 9/2008 | Genschorek | F24S 25/70 126/704 |
| 2009/0114269 A1 * | 5/2009 | Fletcher | H02S 20/23 136/251 |
| 2009/0145423 A1 * | 6/2009 | Carcangiu | H02S 20/00 126/600 |
| 2012/0073220 A1 | 3/2012 | Kobayashi et al. | |
| 2013/0011187 A1 * | 1/2013 | Schuit | H02S 40/34 403/287 |
| 2013/0112248 A1 * | 5/2013 | McPheeters | H02S 20/30 136/251 |
| 2016/0111997 A1 * | 4/2016 | Ganshaw | F24S 25/61 248/224.7 |
| 2016/0126884 A1 * | 5/2016 | Stearns | F16M 13/02 52/173.3 |
| 2017/0040931 A1 * | 2/2017 | Schuit | H02S 20/23 |
| 2017/0302221 A1 * | 10/2017 | Jasmin | H02S 30/10 |
| 2017/0310273 A1 * | 10/2017 | Almy | F24S 25/632 |

\* cited by examiner

*Primary Examiner* — Sadie White
(74) *Attorney, Agent, or Firm* — Lee & Hayes, P.C.

(57) ABSTRACT

A clamping system configured to clamp a photovoltaic module. The clamping system includes a base. A saddle is movably attached to the base to be moved between a first position, in which at least a portion of the saddle is raised compared to the base, and a second position, in which the at least the portion of the saddle is laid adjacent the base. A keeper is movably attached to the saddle such that the keeper catches the photovoltaic module against the saddle, during installation of the photovoltaic module.

20 Claims, 9 Drawing Sheets

CLAMPING SYSTEM FOR MOUNTING A SOLAR PANEL

BACKGROUND

As the solar energy industry continues to grow, the equipment to mount photovoltaic (PV) modules (AKA "solar panels") on different types of structures and/or locations continues to adapt and improve as well. Though a variety of apparatuses exist to clamp onto and secure the PV modules, the number of parts and or different arrangements of the parts still leave much to be desired for an efficient and quick assembly to minimize the amount of time a worker may be working on a roof or in a similarly physically demanding or potentially hazardous condition.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

As described previously, there are many apparatuses and systems that exist to secure photovoltaic (PV) modules on various structures and/or locations. However, these apparatuses and systems often include parts and arrangements that are inefficient and may be difficult and/or time consuming to assemble. This disclosure is directed to a clamping system. Specifically, the clamping system described herein is configured to secure PV modules in a location and/or on a structure. The clamping system described herein may be configured to accommodate various types and sizes of PV modules. While describing the clamping system as being configured to secure PV modules, the clamping system may be used to attach other panel type structures in a location and/or on a structure.

In an embodiment, the clamping system described herein is configured to clamp and/or otherwise secure one or more PV modules. The clamping system may include a base. The base of the clamping system includes an elongated bar having an aperture through a center thereof. In an embodiment, the base may be attached to a stanchion, rail, or other secondary structure. Furthermore, the clamping system includes one or more saddles, in an embodiment. The saddles may be moveably attached to the base such that the saddles are rotatable (or pivotable) between a first position and a second position. In an embodiment, the clamping system includes a first saddle attached to a first portion of the base. The first saddle includes an L-shaped end whereon a first PV module rests when one or more PV modules are installed on the clamping system. The clamping system may also include a second saddle attached to a second portion of the base such that the second saddle is aligned with the first saddle on the bar. The second saddle may also include an L-shaped end on which a second PV module rests when one or more PV modules are installed on the clamping system.

In an embodiment, the clamping system may include one or more keepers attached to respective saddles. For example, the clamping system may include a first keeper attached to the first saddle. The first keeper is configured to secure the first PV module between the first keeper and the first saddle when the first PV module is installed and secured against the first saddle in the clamping system. The first keeper is rotatable about an axis independently of movement of the first saddle. The clamping system may further include a second keeper attached to the second saddle. The second keeper is configured to secure the second PV module between second keeper and the second saddle when the second PV module is installed and secured against the second saddle in the clamping system. The second keeper is rotatable about an axis independently of movement of the second saddle. These and additional details of the bracket are described below with reference to the drawings.

Figure 1:
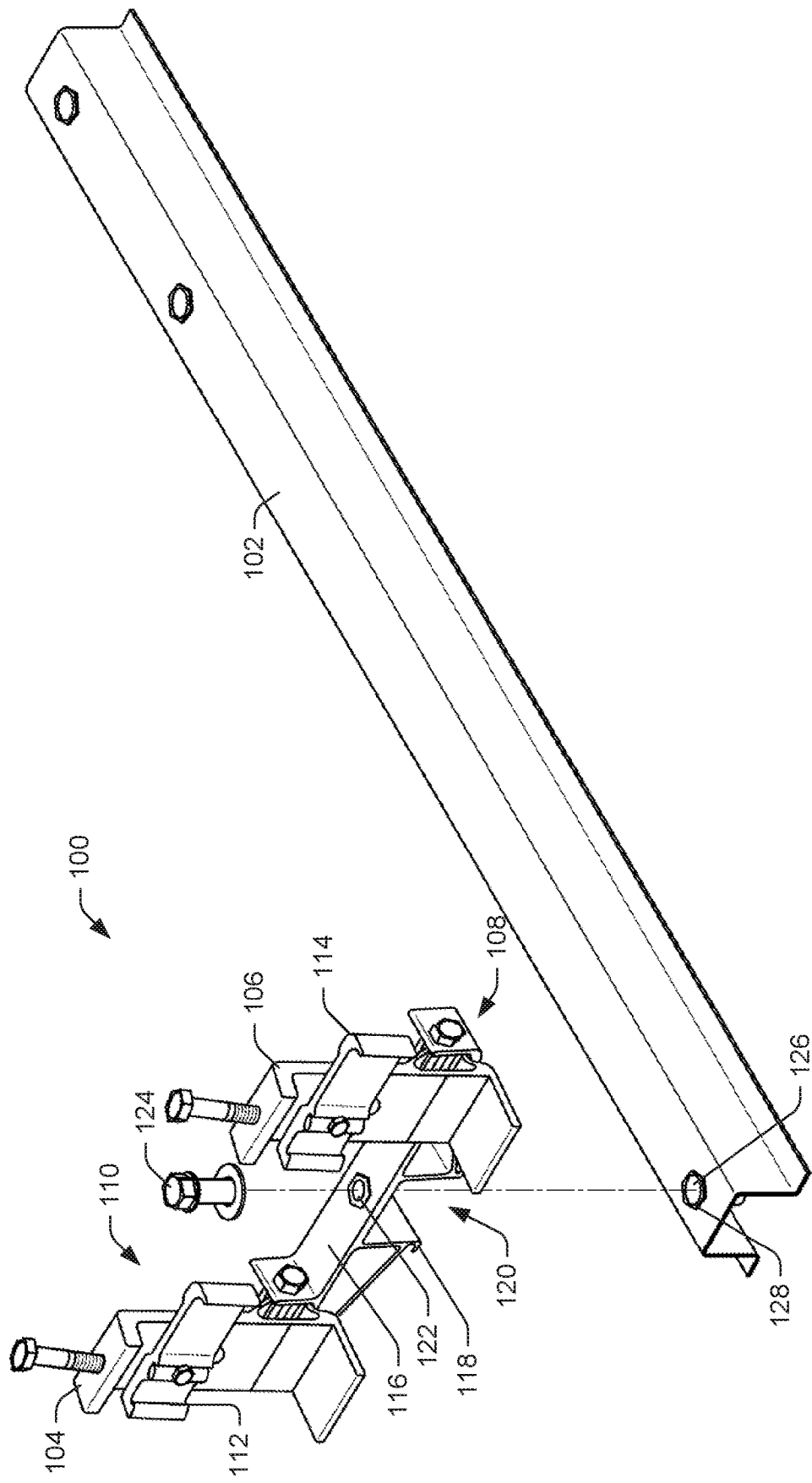
FIG. 1 illustrates a perspective view of an example clamping system according to an embodiment of this disclosure.

FIG. 1 illustrates a perspective view of an example clamping system 100. In FIG. 1, the clamping system 100 is unattached to a secondary structure 102 such as a stanchion, rail, or other secondary structure. As mentioned previously, the clamping system 100 includes one or more saddles. In an embodiment, the one or more saddles includes a first saddle 104 and a second saddle 106 configured to receive one or more PV modules and attach the PV modules to the clamping system 100. The first saddle 104 and the second saddle 106 are moveably attached to a base 108 of the clamping system 100. For example, the first saddle 104 and the second saddle 106 are depicted in a first position 110 in FIG. 1. In the first position (or "upright position"), at least a portion the first saddle 104 and the second saddle 106 are raised relative to the base 108. While describing both the first saddle 104 and the second saddle 106 as being in the first position 110, it is noted that the first saddle 104 and the second saddle 106 are independently moveable.

Furthermore, as shown in FIG. 1, the clamping system 100 includes a first keeper 112 moveably attached to the first saddle 104. In an embodiment, the first keeper 112 is configured to catch a PV module and secure the PV module against the first saddle 104 between the first keeper 112 and the first saddle 104. The clamping system 100 further includes a second keeper 114 moveably attached to the second saddle 106. The second keeper 114 is configured to catch a PV module and secure the PV module against the second saddle 106 between the second keeper 114 and the second saddle 106.

In an embodiment, the base 108 of the clamping system 100 includes a bar 116 that extends in a first direction. The bar 116 includes a pair of bracket members 118 that extend away from a side of the bar and are spaced apart such that a gap 120 exists between the pair of bracket members 118. In an embodiment, the gap 120 is sized to accommodate the secondary structure 102 therein. As shown in FIG. 1, an example of a secondary structure 102 is a rail. However, the clamping system 100 may be shaped and/or configured to be attachable to any type of secondary structure such as a stanchion, rail, wall, roof, post or other secondary structure.

The bar 116 may further include an aperture 122 through the bar 116. The aperture 122, as shown, is aligned with the gap 120 between the pair of bracket members 118 to accommodate a fastener 124. The fastener 124 may be configured to attach the clamping system 100 to the secondary structure 102. For example, the secondary structure 102 may also include an aperture 126 sized to receive and secure the fastener 124 therein. For example, the fastener 124 may include a bolt with a washer. However, the fastener 124 may include any suitable type of fastener including a bolt, screw, or other type of fastener that sufficiently secures the bar 116 to the secondary structure 102. The secondary structure 102 may include a nut 128 attached thereto that includes threading configured to receive threading of the fastener 124. In an embodiment, the nut 128 may be located within the aperture 126 of the secondary structure 102. However, in an embodiment, the aperture 126 in the secondary structure 102 may include threading therein and may thereby eliminate the need for a nut 128 for attaching the fastener 124 to the secondary structure 102.

Figure 2:
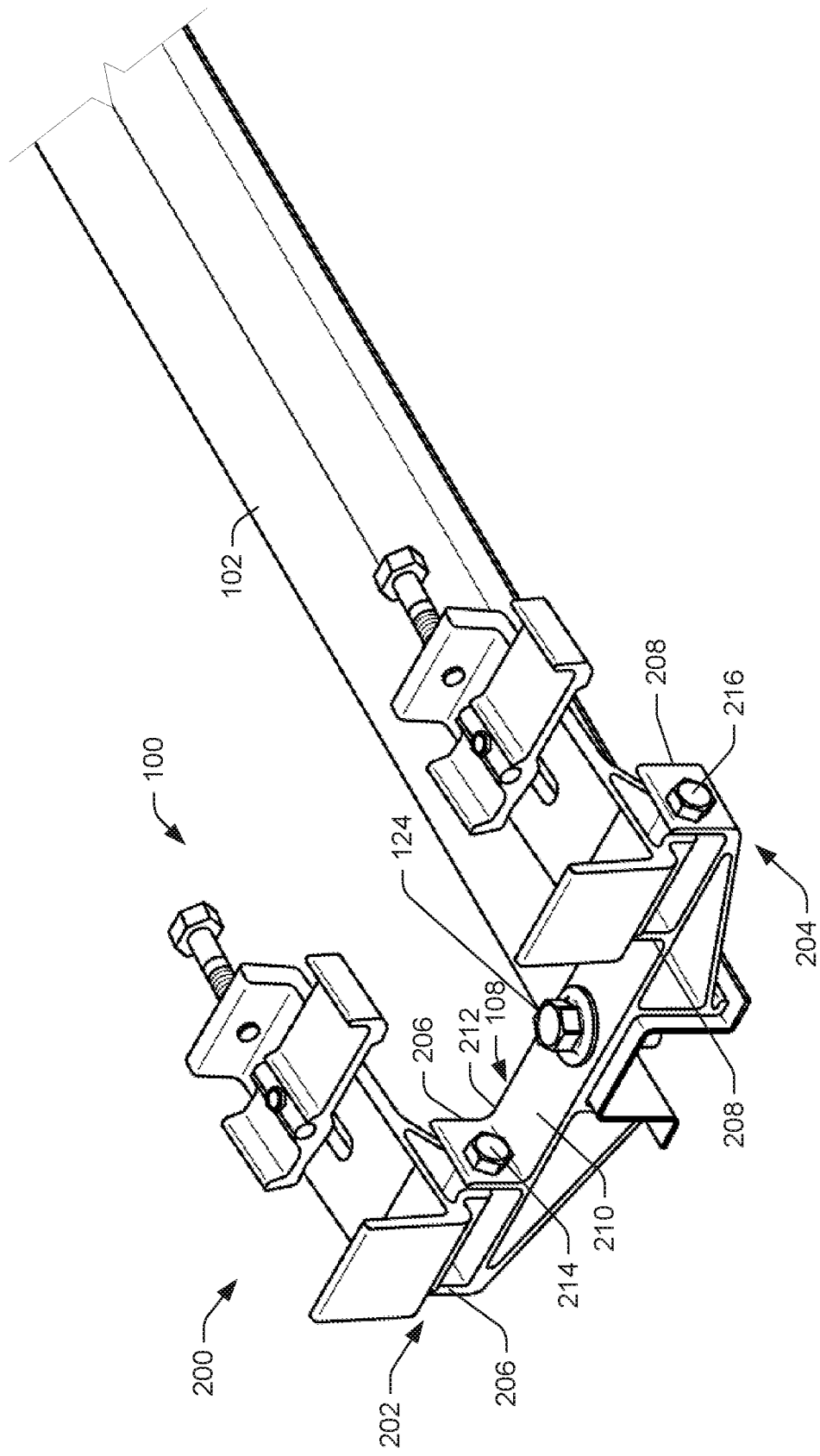
FIG. 2 illustrates a perspective view of an example clamping system mounted on a rail according to an embodiment of this disclosure.

FIG. 2 illustrates a perspective view of the clamping system 100. In FIG. 2, the clamping system 100 is depicted as attached to the secondary structure 102. For example, the fastener 124 may be inserted into the aperture 126 in the secondary structure 102, thereby securing the clamping system 100 thereto. Furthermore, FIG. 2 depicts the clamping system 100 with the first saddle 104 and the second saddle 106 in a second position (or "laid-back position") 200. In the second position 200, at least a portion of the first saddle 104 and at least a portion of the second saddle 106 are laid back with respect to the base 108 of the clamping system 100. As mentioned previously, the first saddle 104 and the second saddle 106 are independently moveable between the first position 110 and the second position 200. In an embodiment, the first saddle 104 and the second saddle 106 may be positioned in the first position 110 during an installation process of one or more PV modules, while being positioned in the second position 200 once the one or more PV modules are installed in the clamping system 100.

In an embodiment, the base 108 of the clamping system 100 includes a first end 202 and a second end 204 opposite the first end 202. The first saddle 102 may be attached to the first end 202 of the base 108, while the second saddle 104 is attached to the second end 204 of the base 108. For example, as mentioned previously, the base 108 includes the bar 116 that extends in a first direction. The base 108 further includes a first pair of saddle attachment arms 206 located on the first end 202 of the base 108 disposed away from the aperture 122 in the base 108. The first pair of saddle attachments arms 206 are spaced apart from each other and extend from the first end 202 of the base 108 in a second direction that is transverse to the first direction of extension of the bar 116 of the base 108. The first saddle 104 may be attached to the first pair of saddle attachment arms 206 such that the first saddle 104 is moveable, via a pivoting action, in a space between the first pair of saddle attachment arms 206.

Similarly, the base 108 includes a second pair of saddle attachment arms 208 located on the second end 204 of the base 108 disposed away from the aperture 122 in the base 108 (on the side that is opposite the first pair of saddle attachment arms 206). The second pair of attachment arms 208 are spaced apart from each other and extend from the second end 204 of the base 108 in the second direction that is transverse to the first direction of extension of the bar 116 of the base 108. The second saddle 106 may be attached to the second pair of saddle attachment arms 208 such that the second saddle 106 is moveable, via a pivoting action, in a space between the second pair of saddle attachment arms 208.

Furthermore, the bar 116 of the base 108 is defined, at least in part, by an elongated surface 210 having a perimeter bounded by opposing side edges 212. The base 108 further includes a first pivot hinge point 214, between the base 108 and the first saddle 104, located above the elongated surface 210 and disposed such that the first saddle 104 is moveable via a pivoting action between the first position 110 and the second position 200. Similarly, the base 108 also includes a second hinge point 216, between the base 108 and the second saddle 106, located above the elongated surface and disposed such that the second saddle 106 is moveable via a pivoting action between the first position 110 and the second position 200.

Figure 3:
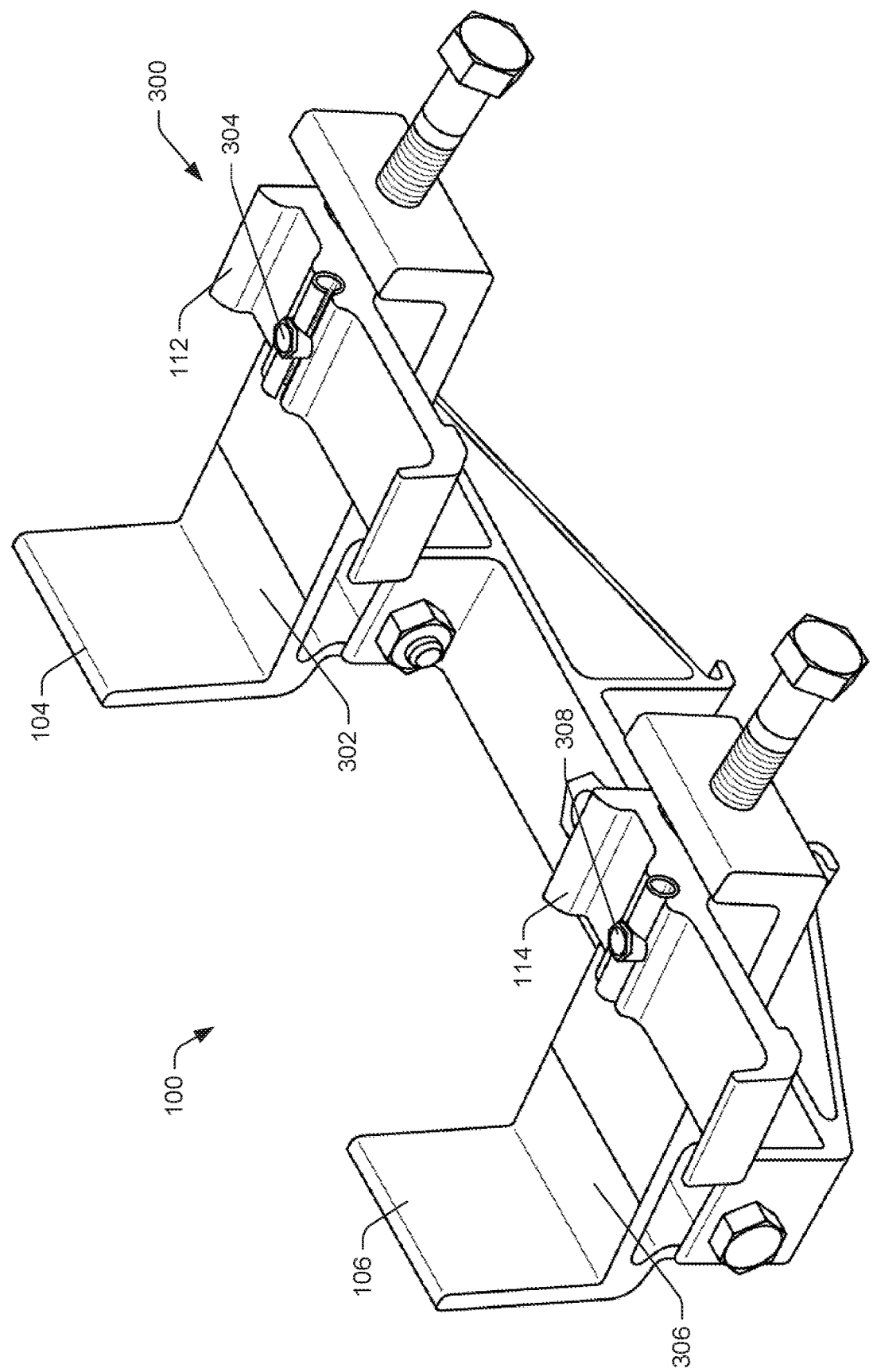
FIG. 3 illustrates a perspective view of an example clamping system in an uninstalled position according to an embodiment of this disclosure.

FIG. 3 illustrates a perspective view of the clamping system 100. As shown in FIG. 3, the first keeper 112 and the second keeper 114 are in a first position 300. Furthermore, the first saddle 104 and the second saddle 106 are shown in the second position 200 in FIG. 3. In an embodiment, the first position 300 is an uninstalled position in which the first keeper 112 and the second keeper 114 are rotated such that one or more PV modules may be placed in a space between the first saddle 104 and the first keeper 112 and a space between the second saddle 106 and the second keeper 114. In an embodiment, the first keeper 112 is attached to a main surface 302 of the first saddle 104 via a first fastener 304 that is fixed such that the first keeper 112 is rotatable in a plane that is parallel to the main surface 302 of the first saddle 104. Similarly, the second keeper 114 is attached to a main surface 306 of the second saddle 106 via a second fastener 308 that is fixed such that the second keeper 114 is rotatable in a plane that is parallel to the main surface 306 of the second saddle 106. In an embodiment, the first keeper 112 is rotatable about an axis independent of movement of the first saddle 104. The axis may be defined by a direction of extension of the first fastener 304. Furthermore, the second keeper 114 is rotatable about an axis independent of movement of the second saddle 106. The axis may be defined by a direction of extension of the second fastener 306.

Figure 4:
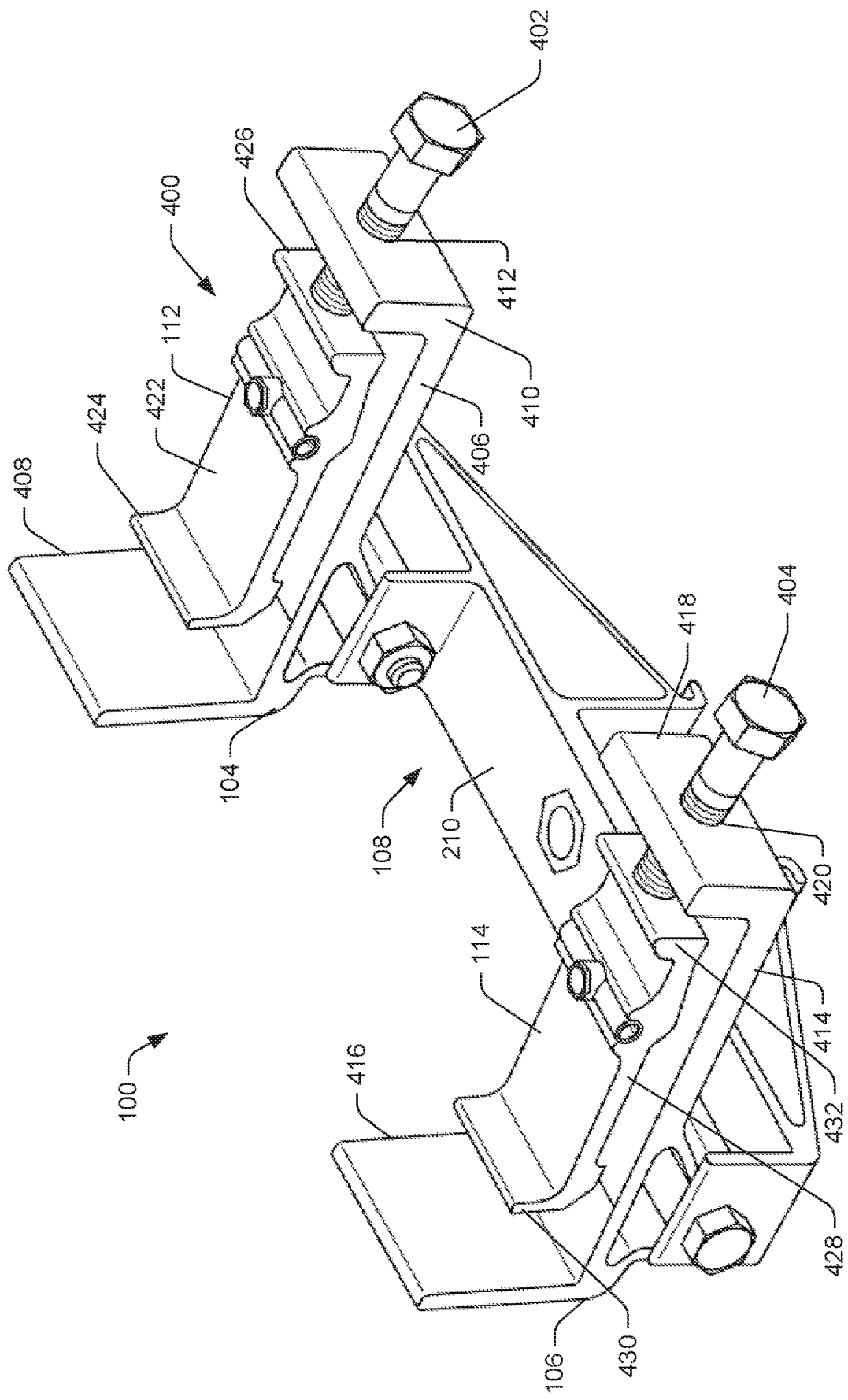
FIG. 4 illustrates a perspective view of an example clamping system in an installed position according to an embodiment of this disclosure.

FIG. 4 illustrates a perspective view of the clamping system 100. As shown in FIG. 4, the first keeper 112 and the second keeper 114 are in a second position 400. Furthermore, the first saddle 104 and the second saddle 106 are shown in the second position 200 in FIG. 4. In an embodiment, the second position 400 is an installed position in which the first keeper 112 and the second keeper 114 are rotated to secure one or more PV modules in the clamping system 100. For example, in the second position 400, the first keeper 112 secures a PV module between the first keeper 112 and the first saddle 104 and the second keeper 114 secures a PV module between the second keeper 114 and the second saddle 106. In an embodiment, the clamping system 100 includes a first keeper fastener 402 configured to secure the first keeper 112 in the second position 400 when the first keeper 112 secures a PV module between the first keeper 112 and the first saddle 104. The clamping system 100 further includes a second keeper fastener 404 configured to secure the second keeper 114 in the second position 400 when the second keeper 114 secures a PV module between the second keeper 114 and the second saddle 106.

As shown in FIG. 4, the first saddle 104 includes a body 406 that extends longitudinally. When the first saddle 104 is in the second position 200, as described above, the body 406 of the first saddle 104 may be substantially parallel to the elongated surface 210 of the base 108. However, when the first saddle 104 is positioned in the first position 110, the body 406 of the first saddle 104 may extend in a direction transverse to a direction of extension of the surface 210 of the base 108. The first saddle 104 may include a first flange 408 (or L-shaped end) that extends away from a first end of the body 406 of the first saddle 104. The first saddle 104 may further include a second flange 410 that extends away from a second end of the body 406 of the first saddle 104, the second end being opposite the first end. In an embodiment, the second flange 410 includes an aperture 412 sized to accommodate the first keeper fastener 402 therethrough. The clamping system 100 may lock the first keeper 112 in the second position 400 when a PV module is secured between the first keeper 112 and the first saddle 104.

Similarly, the second saddle 106 includes a body 414 that extends longitudinally. When the second saddle 106 is in the second position 200, as described above, the body 414 of the second saddle 106 may be substantially parallel to the elongated surface 210 of the base 108. However, when the second saddle 106 is positioned in the first position 110, the body 414 of the second saddle 106 may extend in a direction transverse to a direction of extension of the surface 210 of the base 108. The second saddle 104 may include a first flange 416 (or L-shaped end) that extends away from a first end of the body 414 of the second saddle 106. The second saddle 106 may further include a second flange 418 that extends away from a second end of the body 414 of the second saddle 106, the second end being opposite the first end. In an embodiment, the second flange 418 includes an aperture 420 sized to accommodate the second keeper fastener 404 therethrough. The clamping system 100 may lock the second keeper 114 in the second position 400 when a PV module is secured between the second keeper 114 and the second saddle 106.

Furthermore, the first keeper 112 includes an elongated main body 422 extending in a substantially longitudinal direction. In an embodiment, the main body 422 of the first keeper 112 is substantially parallel to the body 406 of the first saddle 104. The first keeper 112 includes a first flange 424 on a first end of the main body 422 of the first keeper 112. The first flange 424 extends in a direction that is transverse to the direction of extension of the main body 422 of the first keeper 112. The first keeper 112 further includes a second flange 426 on a second end of the main body 422 of the first keeper 112, the first end being opposite the second end. The second flange 426 extends in a direction that is transverse to the direction of extension of the main body 422 of the first keeper 112. When the main body 422 of the first keeper 112 is in the second position 400, the first flange 424 is positioned adjacent a first PV module to catch the first PV module when installed. Furthermore, the second flange 426 of the first keeper 112 is positioned adjacent the first keeper fastener 402 (or fastening portion) of the first saddle 104 when the first keeper 112 is in the second position 400.

Similarly, the second keeper 114 includes an elongated main body 428 extending in a substantially longitudinal direction. In an embodiment, the main body 428 of the second keeper 114 is substantially parallel to the body 414 of the second saddle 106. The second keeper 114 includes a first flange 430 on a first end of the main body 428 of the second keeper 114. The first flange 430 extends in a direction that is transverse to the direction of extension of the main body 428 of the second keeper 114. The second keeper 114 further includes a second flange 432 on a second end of the main body 428 of the second keeper 114, the first end being opposite the second end. The second flange 432 extends in a direction that is transverse to the direction of extension of the main body 428 of the second keeper 114. When the main body 428 of the second keeper 114 is in the second position 400, the first flange 430 is positioned adjacent a second PV module to catch the second PV module when installed. Furthermore, the second flange 432 of the second keeper 114 is positioned adjacent the second keeper fastener 404 (or fastening portion) of the second saddle 106 when the second keeper 114 is in the second position 400.

In an embodiment, when the first keeper fastener 402 and the second keeper fastener 404 are tightened, the first keeper fastener 402 and the second keeper fastener 404 are tightened against the first keeper 112 and the second keeper 114, respectively, thereby sliding the first keeper 112 and the second keeper 114 downward (or toward respective frames of installed PV modules). As such, the first keeper fastener 402 and the second keeper fastener 404 may cause the first keeper 112 and the second keeper 114 to clamp respective frames of installed PV modules between the first keeper 112 and the second keeper 114 and the first flange 408 and the second flange 416, respectively.

Figure 5:
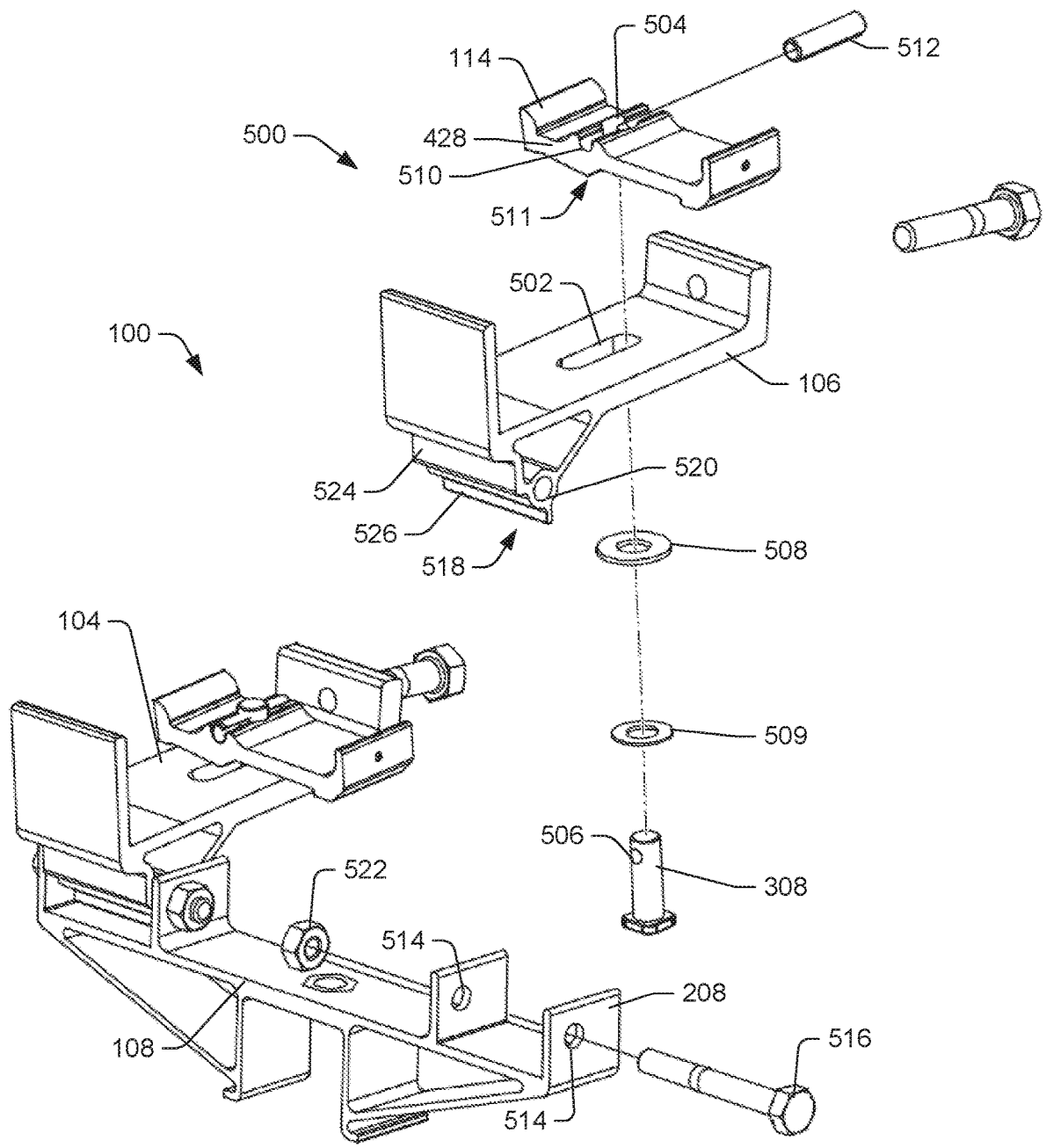
FIG. 5 illustrates an exploded view of an example clamping system according to an embodiment of this disclosure.

FIG. 5 illustrates a partially exploded view of the clamping system 100. As shown in FIG. 5, the second saddle 106 is shown in an expanded view in order to depict a saddle assembly 500 showing components thereof. While showing and describing the saddle assembly 500 with respect to the second saddle 106 and the components thereof, the first saddle 104 may include a same or substantially similar assembly. As mentioned previously, the second saddle 106 includes the second keeper 114 attached thereto. The second keeper 114 is attached to the second saddle 106 via the second fastener 308. The second fastener 308 may be inserted through an aperture 502 in the second saddle 106 and an aperture 504 in the second keeper 114. As shown in FIG. 3, the second fastener 308 may be inserted through the second saddle 106 and the second keeper 114 such that at least a portion of the second fastener 308 extends above a surface of the second keeper 114. In an embodiment, the second fastener 308 includes an aperture 506 through a tip end thereof and the second fastener 308 is inserted through the second saddle 106 and the second keeper 114 such that the aperture 506 at least partially above the surface of the second keeper 114. As shown in FIG. 5, the saddle assembly 500 includes one or more washers 508 disposed between a surface of the second fastener 308 and a surface of the second saddle 106. The saddle assembly 500 may further include a spring 509. When assembled, the spring 509 may cause a lifting force to be exerted on the second keeper 114, or likewise the first keeper 112. In some examples, the spring 509 may include a wave spring, coil spring, Belleville washer, or other type of spring.

Furthermore, the second keeper 114 includes a groove 510 on a top surface of the main body 428 of the second keeper 114. The groove 510 is shaped to receive a pin 512 therein and the pin 512 may be configured to secure the second keeper 114 to the second saddle 106 in conjunction with the second fastener 308. For example, the pin 512 is inserted through the aperture 506 in the second fastener 308, thereby securing the second keeper 114 to the second saddle 106.

Additionally, the second keeper 114 includes a ridge 511 on a bottom surface of the main body 428 of the second keeper 114. As such, the ridge 511 is located on a surface of the main body 428 opposite a surface on which the groove 510 is located. As mentioned previously, the saddle assembly 500 includes a spring 509 that, when assembled, causes a downward force to be applied to the second keeper 114 via the second fastener 308 and the pin 512. Additionally, when the second keeper 114 is in the first position 110, the ridge 511 may be at least partially pulled into the aperture 502 of the second saddle 106 (or likewise the first saddle 104) by the downward force caused at least in part by the spring 509, as is illustrated by the first saddle 104 (and its corresponding assembly in FIG. 5). Thus, the position of the second keeper 114 is maintained (via the downward force and the ridge 511) until a sufficient rotational force (e.g., a force that overcomes the downward force pulling the ridge 511 into the aperture 502) is applied to the second keeper 114 in order to rotate the second keeper 114 from the first position 300 to the second position 400. Such movable positioning is useful, for example, when shipping the clamping system to maintain the keepers oriented at 90° with respect to the saddles, whereby upon arrival and opening, the product is immediately ready for implementation.

As described previously, the clamping system 100 includes the second pair of attachment arms 208. As shown in FIG. 5, each attachment arm of the second pair of attachment arms includes an aperture 514 therethrough. In an embodiment, a bolt 516, or other securing mechanism (such as a pin, rod, etc.) is inserted through the aperture 514 in the second pair of attachment arms 514. As shown in FIG. 5, the second saddle 106 includes a bracket 518 extending from a side of the second saddle 106. In an embodiment, the bracket 518 includes a sleeve 520 and is sized to be insertable between the second pair of attachment arms 208. Furthermore, the bolt 516 is insertable through the sleeve 520, thereby securing the second saddle 106 and the saddle assembly 500 to the base 108 of the clamping system 100. Once the bolt 516 is inserted through the apertures 514 and the sleeve 520, a nut 522 may be fastened to the end of the bolt 516, securing the bolt 516 in the apertures 514 and the sleeve 520. In an embodiment, the clamping system 100 may include any fastening means allowing the second saddle 106 to pivot while secured in the second pair of attachment arms 208.

The bracket 518 further may include a flat surface 524. The flat surface 524 provides a built-in stop that, whereby when the second saddle 106 (herein used as an example of a saddle) is rotated in the first position 110, the flat surface 524 contacts the base 108 and prevents the second saddle 106 from rotating further forward. The bracket 518 also includes a tab 526 extending from the sleeve 520. In an embodiment, the tab 526 provides another built-in stop that, whereby when the second saddle 106 is rotated in the second position 200, the tab 526 contacts the base 108 and prevents the second saddle 106 from rotating further backward. Likewise, the features described herein this paragraph with respect to the second saddle 106 may equally be applicable to the corresponding features in the first saddle 104.

Figure 6:
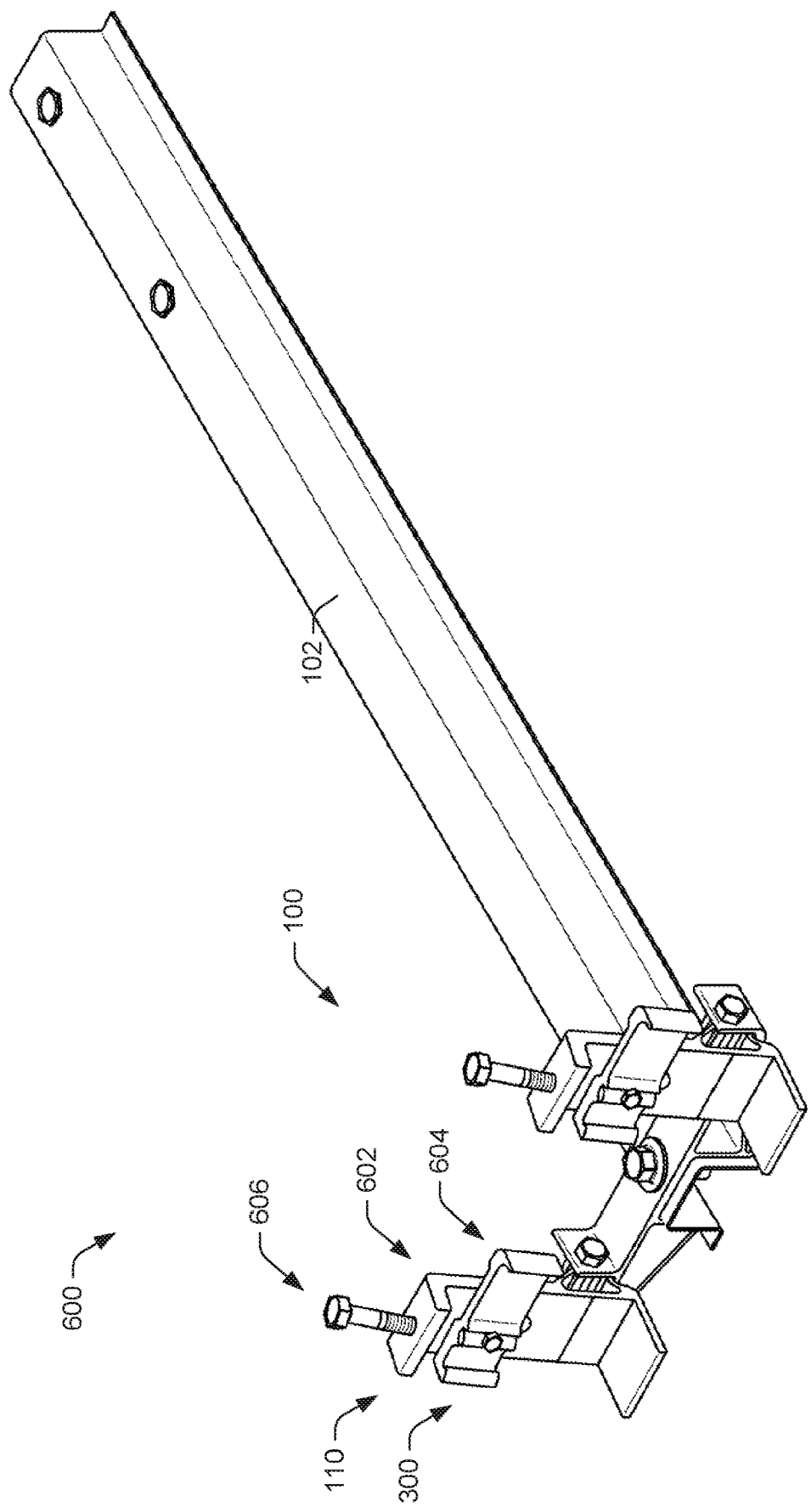
FIG. 6 illustrates a perspective view of an example clamping system mounted on a rail in an uninstalled position according to an embodiment of this disclosure.

FIGS. 6-9 illustrate the clamping system 100 in example steps during an installation process for installing one or more PV modules thereon. For example, FIG. 6 depicts a first step 600 in the installation process. For ease of reference, in FIGS. 6-9, the first saddle 104 and the second saddle 106 may be referred to as the saddles 602, the first keeper 112 and the second keeper 114 may be referred to as the keepers 604, and the first keeper fastener 402 and the second keeper fastener 404 may be referred to as the keeper fasteners 606. In the first step 600, the clamping system 100 is attached to the secondary structure 102. As shown in FIG. 6, in the first step 602, the saddles 602 may be positioned in the first position 110. That is, the saddles 602 may be positioned in an upright position. Furthermore, the keepers 604 may be positioned in the first position 300 (or "uninstalled position"). In the uninstalled position 300, the keepers 604 extend in a direction that is substantially transverse to a direction of extension of the bodies of the saddles 602, as described previously.

Figure 7:
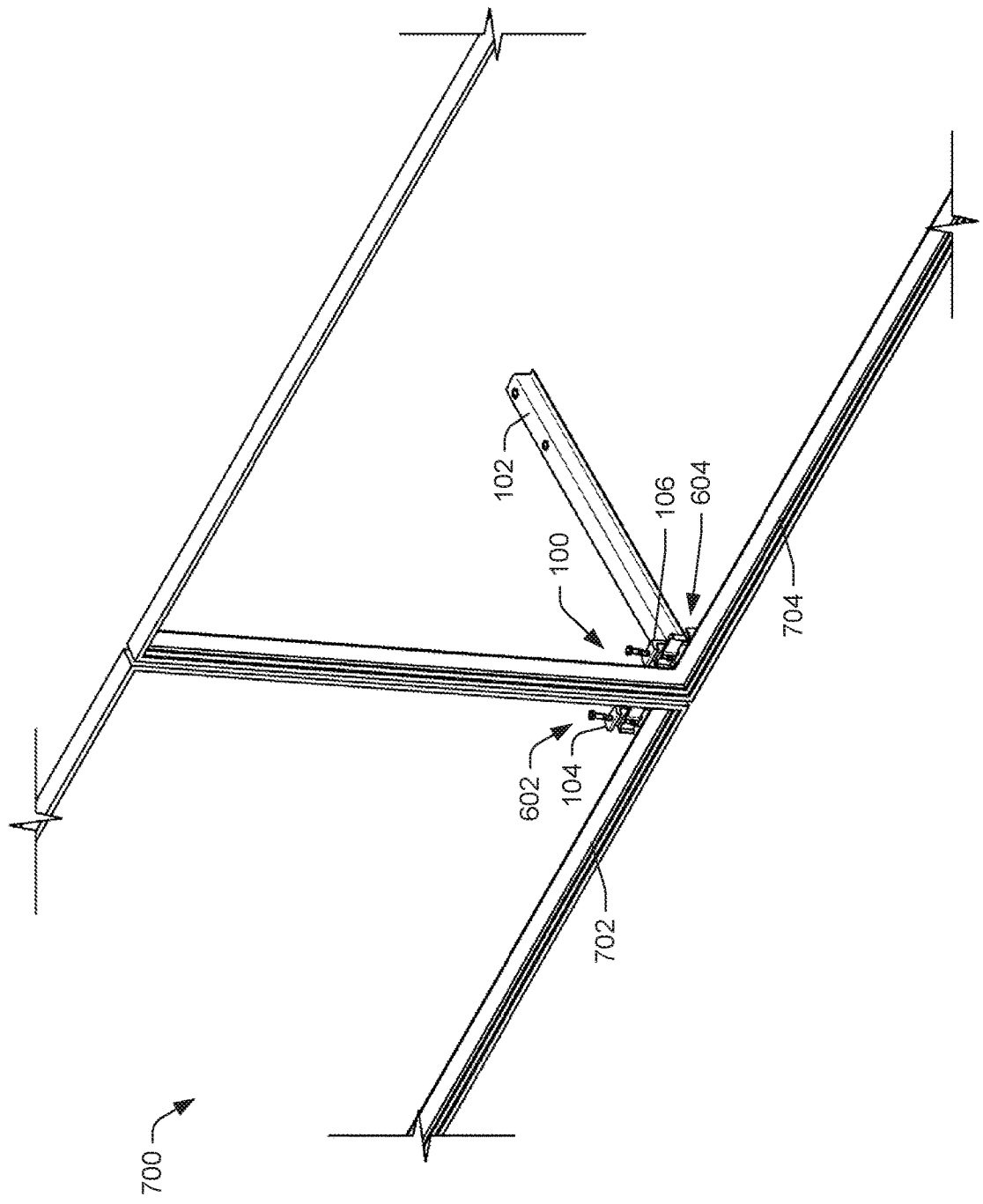
FIG. 7 illustrates a perspective view of an example clamping system with photovoltaic (PV) modules resting vertically on saddles of the clamping system according to an embodiment of this disclosure.

The installation process continues to a second step 700, shown in FIG. 7. As shown in FIG. 7, during the second step 700, a first PV module is placed on the L-shaped end of the first saddle 104 and a second PV module is placed on the L-shaped end of the second saddle 106. At the second step 700, the saddles 602 may be in the upright position 110 and the keepers 604 may be in the uninstalled position 300.

Figure 8:
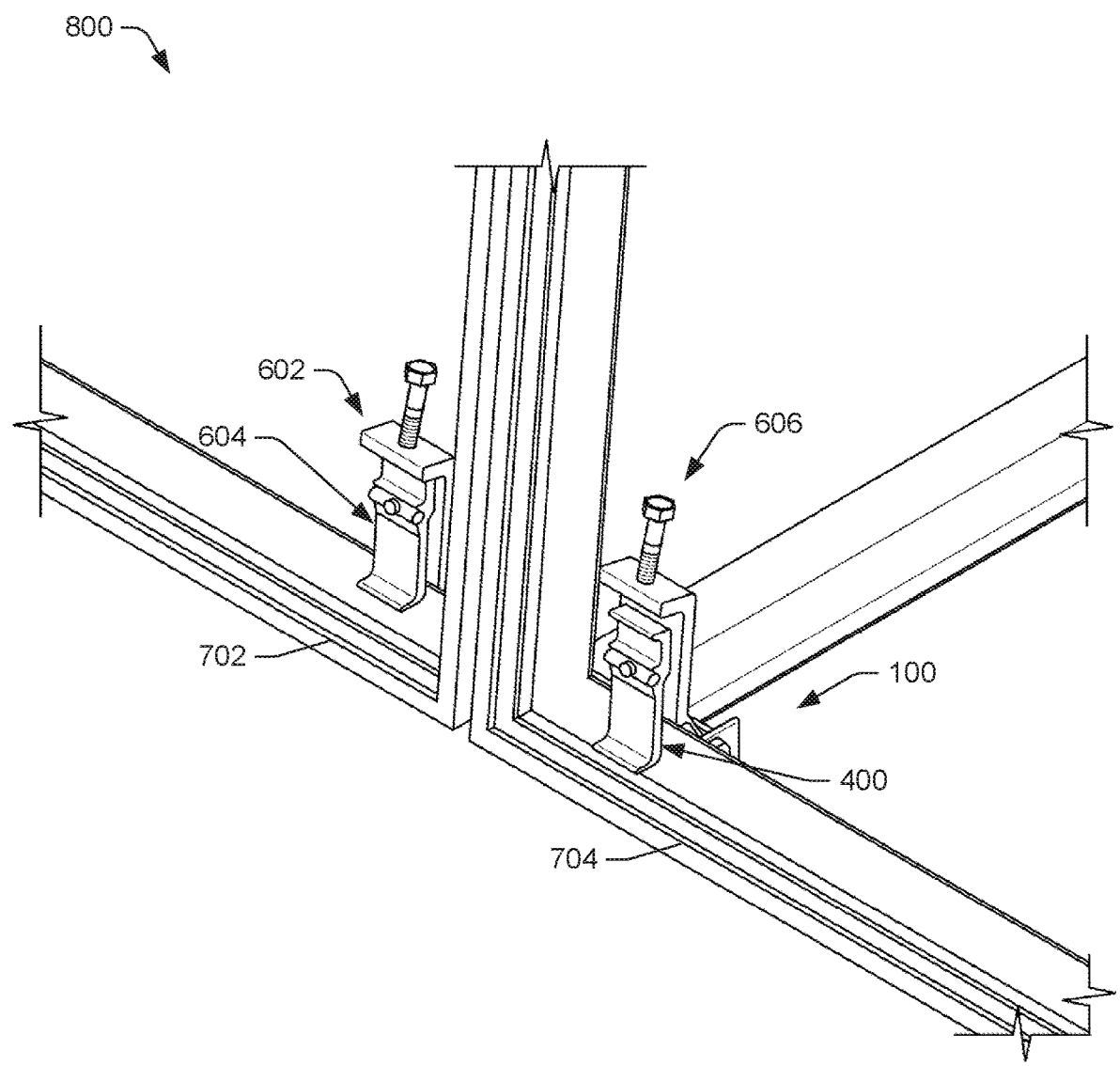
FIG. 8 illustrates a perspective view of an example clamping system in an installed position according to an embodiment of this disclosure.

The installation process continues to a third step 800, shown in FIG. 8. At the third step 800, the keepers 604 are rotated to the second position 400 (or "installed position"). In the installed position 400, the keepers 604 catch the PV modules 702 and 704 between the keepers 604 and the saddles 602, thereby securing the PV modules 702 and 704 in the clamping system 100. Furthermore, at the third step 800, the keeper fasteners 606 may be tightened to maintain the position of the keepers 604 in the installed position 400.

As mentioned previously, when the first keeper fastener 402 and the second keeper fastener 404 are tightened, the first keeper fastener 402 and the second keeper fastener 404 are tightened against the first keeper 112 and the second keeper 114, respectively, thereby sliding the first keeper 112 and the second keeper 114 downward (or toward respective frames of installed PV modules). As such, the first keeper fastener 402 and the second keeper fastener 404 may cause the first keeper 112 and the second keeper 114 to clamp respective frames of installed PV modules between the first keeper 112 and the second keeper 114 and the first flange 408 and the second flange 416, respectively. Furthermore, when the first keeper fastener 402 and the second keeper fastener 404 are tightened, the spring 509 (described previously) is compressed causing the first keeper 112 and the second keeper 114 to raise from the surface of the first saddle 104 and the second saddle 106 onto respective pins 512. As such, the first keeper 112 and the second keeper 114 may provide both a clamping force against the module flange and a compressive force on the adjoining (and transversely extending) module wall of the frames of the first PV module 702 and the second PV module 704, respectively.

Figure 9:
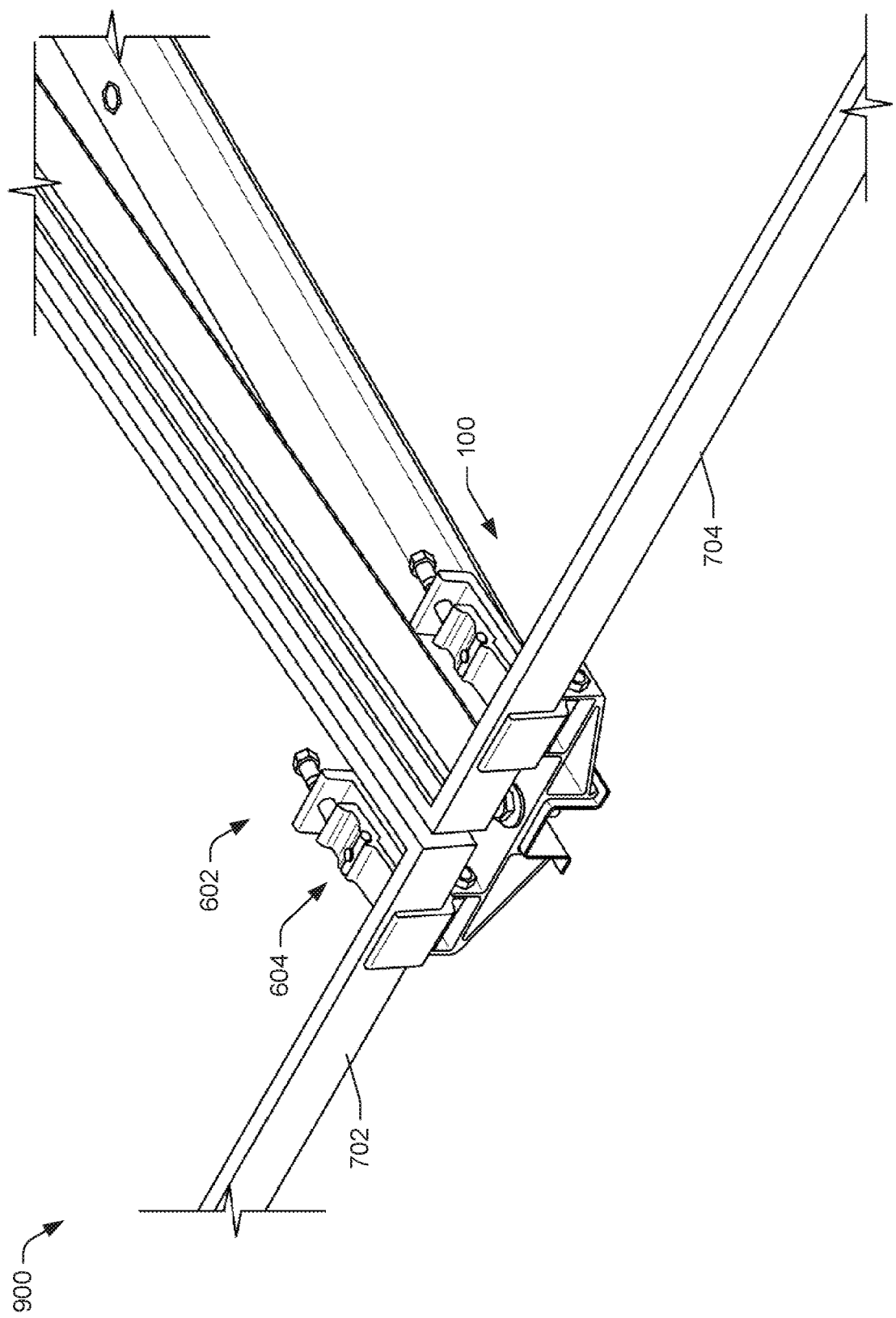
FIG. 9 illustrates a perspective view of an example clamping system with PV modules in a laid-back position according to an embodiment of this disclosure.

The installation process continues to a fourth step 900, shown in FIG. 9. At the fourth step 900, the saddles 602 are rotated into the second (or "laid back") position 200 as the PV modules 702 and 704 are laid substantially horizontal.

Conclusion

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A clamping system configured to clamp a photovoltaic module, the clamping system comprising:
    a base configured to fixedly attach to a rail at a midpoint of the base, the base extending in a direction that is transverse to a direction of the rail;
    a saddle fixedly attached to a first end of to the base, via a first pivot hinge joint at a first end of the saddle, about which the saddle is movable between a first position, in which a second end of the saddle is raised in a first direction of extension from the base limited by a first built-in stop, and a second position, in which the second end of the saddle is laid in a second direction of extension from the base, the second direction of extension being transverse to the first direction of extension; and
    a keeper fixedly attached to the saddle, via a second pivot hinge joint, via which the keeper is movable between a first position, in which the keeper is parallel to the base, and a second position, in which the keeper is perpendicular to the base, such that the keeper catches the photovoltaic module against the saddle, during installation of the photovoltaic module.

2. The clamping system according to claim 1, wherein the base includes:
    a bar that extends in a first direction, and
    a pair of saddle attachment arms, spaced apart from each other, extending from an end of the bar in a second direction that is transverse to the first direction, and
    wherein the saddle is movable, via a pivoting action, in the space between the pair of the saddle attachment arms.

3. The clamping system according to claim 1, further comprising a fastener attached to the saddle to secure the keeper in a fixed position to clamp the photovoltaic module during the installation of the photovoltaic module.

4. The clamping system according to claim 1, wherein the base includes a first end and a second end opposite the first end,
    wherein the saddle is a first saddle and the keeper is a first keeper, the first saddle and the first keeper being attached to the first end of the base, and
    wherein the clamping system further comprises:
        a second saddle movably attached to the second end of the base, and
        a second keeper movably attached to the second saddle.

5. The clamping system according to claim 1, wherein the base includes a bar having:
    a first side to which the saddle is attached, and
    a second side including a pair of bracket members that extend away from the bar and are spaced apart such that a gap exists therebetween, the gap being sized to accommodate a portion of a rail therein.

6. The clamping system according to claim 5, wherein the bar further has an aperture through the bar and aligned with the gap between the pair of bracket members to accommodate a fastener therein.

7. The clamping system according to claim 1, wherein the base includes:
    a bar defined, at least in part, by an elongated surface having a perimeter bounded by opposing side edges, and
    the first pivot hinge point, between the base and the saddle, is located above the elongated surface,
    wherein the saddle includes:
    a body that extends longitudinally, and
    a flange extending away from the first end of the body,
    wherein, in the first position, a surface of the body of the saddle is substantially parallel with the elongated surface of the bar, and
    wherein, in the second position, a surface of the flange of the saddle is substantially parallel with the elongated surface of the bar.

8. The clamping system according to claim 7, wherein the flange of the saddle is a first flange,
    wherein the saddle further includes a second flange extending away from the second end of the body, and
    wherein the second flange includes an aperture sized to accommodate a fastener therethrough, via which the clamping system locks into a secure position when securing the photovoltaic module.

9. A clamping system for securing one or more photovoltaic ("PV") modules, the clamping system comprising:
    a base including an elongated bar having an aperture through a center thereof;
    a first saddle fixedly attached to a first portion of the base, via a first pivot hinge joint, about which the first saddle is movable between a first position and a second position, the first saddle having an L-shaped end whereon a first PV module of the one or more PV modules rests when installed;
    a second saddle fixedly attached to a second portion of the base, via a second pivot hinge joint, about which the second saddle is movable between a first position and a second position, the second saddle being aligned along the bar with the first saddle, and the second saddle having an L-shaped end whereon a second PV module of the one or more PV modules rests when installed;
    a first keeper attached to the first saddle, the first keeper configured to catch the first PV module when installed and secure the first PV module against the first saddle; and
    a second keeper attached to the second saddle, the second keeper configured to catch the second PV module when installed and secure the second PV module against the second saddle.

10. The clamping system according to claim 9, wherein the first saddle and the second saddle are attached to a first side of the bar, and
    wherein the base further includes a pair of arms that extend from a second side of the bar that is opposite the first side of the bar, the pair of arms being adjacent the aperture on the bar.

11. The clamping system according to claim 9, wherein the first saddle and the second saddle are pivotally attached to the bar to be pivoted between the first position, which is an upright position, and the second position, which is a laid-back position.

12. The clamping system according to claim 9, wherein the first keeper is attached to a main surface of the first saddle via a first fastener fixed such that the first keeper is rotatable in a plane that is parallel to the main surface of the first saddle, and wherein the second keeper is attached to a main surface of the second saddle via a second fastener fixed such that the second keeper is rotatable in a plane that is parallel to the main surface of the second saddle.

13. The clamping system according to claim 12, wherein the first keeper includes:
a main body portion that is elongated,
a first flange on a first end of the main body portion of the first keeper, and
a second flange on a second end of the main body portion of the first keeper,
wherein the second keeper includes:
a main body portion that is elongated,
a first flange on a first end of the main body portion of the second keeper, and
a second flange on a second end of the main body portion of the second keeper,
wherein, when the main body portion of the first keeper is rotated:
the first flange of the first keeper is positioned adjacent the first PV module to catch the first PV module when installed, and
the second flange of the first keeper is positioned adjacent a fastening portion of the first saddle, and
wherein, when the main body portion of the second keeper is rotated:
the second flange of the second keeper is positioned adjacent the second PV module to catch the second PV module when installed, and
the second flange of the second keeper is positioned adjacent a fastening portion of the second saddle.

14. The clamping system according to claim 9, wherein the first saddle and the second saddle each further have a fastening portion at an end opposite the L-shaped ends thereof, respectively, and
wherein the respective fastening portions of the first saddle and the second saddle are actuated to engage and secure the first keeper and the second keeper, respectively, when moved to secure the first PV module and the second PV module, respectively.

15. The clamping system according to claim 9, wherein the first keeper is rotatable about an axis independently of movement of the first saddle, and
the second keeper is rotatable about an axis independently of movement of the second saddle.

16. A clamping system for securing a photovoltaic module, the clamping system comprising:
a rail attachment member including:
an elongated bar having a first side and a second side, and
a pair of arms spaced apart from each other and extending away from the second side of the bar, the pair of arms being spaced at a distance to accommodate a rail directly therebetween;
a module rest member fixedly attached to the rail attachment member, via a pivot hinge joint, about which the module rest member is pivotable about a horizontal axis between a first position in which the module rest member extends longitudinally in a vertical direction and a second position in which the module rest member extends longitudinally in a horizontal direction; and
a catch member rotatably attached to the module rest member such that the catch member is rotatable between:
a first orientation in which the catch member extends in a direction transverse to a direction of extension of the module rest member, and
a second orientation in which the catch member extends in a direction parallel with the direction of extension of the module rest member.

17. The clamping system according to claim 16, wherein the rail attachment member has an aperture formed through the elongated bar and located between the pair of arms.

18. The clamping system according to claim 16, wherein the catch member is sized to fit within opposing ends of the module rest member when in the second orientation.

19. The clamping system according to claim 16, wherein the module rest member is fixedly and pivotally attached to the rail attachment member via a fastener member that extends through an aperture extending from a surface of the module rest member that faces a surface of the elongated bar.

20. The clamping system according to claim 16, wherein, in the first position, a rest surface of the module rest member extends in a plane that is one of coplanar or parallel to a plane through the first side of the elongated bar, and
wherein, in the second position, the rest surface of the module rest member extends in a plane that is substantially orthogonal to the plane through the first side of the elongated bar.

* * * * *